United States Patent [19]
Rennie et al.

[11] Patent Number: 5,490,976
[45] Date of Patent: Feb. 13, 1996

[54] CONTINUOUS ORE REACTION PROCESS BY FLUIDIZING

[75] Inventors: Foster W. Rennie, Wilmington; Tze Chao, Newark, both of Del.; Donald H. Eastham, Victoria, Tex.; James V. Tarbell, Hockessin, Del.

[73] Assignee: E. I. Du Pont de Nemours and Company, Wilmington, Del.

[21] Appl. No.: 232,302

[22] Filed: Apr. 25, 1994

Related U.S. Application Data

[63] Continuation of Ser. No. 890,426, May 29, 1992, abandoned, which is a continuation-in-part of Ser. No. 749,863, Aug. 26, 1991, abandoned.

[51] Int. Cl.$^6$ .............................. C22B 1/00; C22B 3/00; C22B 34/00; C22B 11/00
[52] U.S. Cl. .............................. 423/658.5; 423/1; 423/74; 423/148; 423/DIG. 16
[58] Field of Search .............................. 423/1, 74, 148, 423/658.5, 659, DIG. 16, DIG 5; 209/158, 178; 422/279

[56] References Cited

U.S. PATENT DOCUMENTS

| | | | |
|---|---|---|---|
| 2,745,888 | 5/1956 | Mertes et al. | 260/674 |
| 2,801,966 | 8/1957 | Mertes et al. | 210/33 |
| 3,060,002 | 10/1962 | Leddy | 423/86 |
| 3,468,633 | 9/1969 | Honchar | 23/270 |
| 3,529,933 | 9/1970 | Honchar | 23/202 |
| 3,801,370 | 4/1974 | Porter et al. | 134/79 |
| 3,881,876 | 5/1975 | Porter et al. | 134/79 |
| 3,929,963 | 12/1975 | Kurata | 423/86 |
| 3,959,465 | 5/1976 | Kurata | 423/86 |
| 4,176,159 | 11/1979 | Paixao et al. | 423/80 |
| 4,243,179 | 1/1981 | Magalhaes | 241/29 |
| 4,269,619 | 5/1981 | Keil et al. | 266/44 |
| 5,011,666 | 4/1991 | Chao | 423/82 |

FOREIGN PATENT DOCUMENTS 2028159 3/1980 United Kingdom.

WO92/20827 11/1992 WIPO.

OTHER PUBLICATIONS

Wherry, T. C. et al., "Guide to Profitable Computer Control", no month, pp. 69–72.
Sinha, N. H. "Fluidized Bed Leaching of Ilmenite", May, 1978, 11th Commonwealth Mining & Metall. Cong, Hong Kong, Inst. of Mining & Metallurgy.
Berezowskey, R. M. G. S. "The Commercial Status of Pressure Leaching Technology", Jnl. of Mining, Feb, 1991, pp. 9–15.
Fluidization, by M. Leva, McGraw–Hill (N.Y.) 1959, no month.
Fluidization, by D. F. Othmar, Reinhold (N.Y.) 1956, no month p. 4.
Dreisinger, D., "R & D Opportunities for Pressure Hydrometallurgy" Jnl. of Mining, Feb., 1991. p. 8.
Thomas, K., "Alkaline and Acidic Autoclaving of Refractory Gold Ores", Jnl. of Mining, Feb., 1991, pp. 16–19.
Peters, E., "The Mathematical Modeling of Leaching Systems" Jnl. of Mining, Feb., 1991, pp. 20–26.

*Primary Examiner*—Steven Bos

[57] ABSTRACT

In a continuous process for reacting particulate ore with a liquid reagent in a counter-current vertical column the improvement comprising:

(a) providing an upper and lower chamber for the vertical column;

(b) maintaining sufficient upward flow of liquid reagent in The upper chamber so that the particulate ore is wetted and deaerated, at least some fine particles thereof are carried overhead for removal, and the remainder thereof settle and enter the lower chamber; and (c) maintaining sufficient fluidization and retention time in the lower chamber so that the desired amount of reaction with the ore takes place, at least some of the fine ore particles which are generated from the reaction process and/or which are introduced with the particulate ore are entrained and carried upward for removal, and the reacted particulate ore exits the lower chamber.

17 Claims, 1 Drawing Sheet

CONTINUOUS ORE REACTION PROCESS BY FLUIDIZING

This is a continuation of application Ser. No. 07/890,426 filed May 29, 1992, now abandoned, which in turn is a continuation-in-part of U.S. patent application Ser. No. 07/749,863 filed Aug. 26, 1991, now abandoned.

BACKGROUND OF THE INVENTION

This invention relates to an improved continuous ore reaction process. While other ore reaction processes are known, they appear to have one or more deficiencies. Benefits of the process of this invention and some of the deficiencies of prior art processes which are overcome with the process of this invention include:

(1) the ability to operate efficiently and economically at pressures in excess of atmospheric, (2) the ability to remove efficiently and economically fine particles of ore which are part of the ore introduced into the process or which are generated during the process, (3) the ability to cool rapidly the ore slurry exiting the process and to retard flow of liquid reagent out of the process, (4) the ability to operate efficiently and economically on a continuous basis, (5) the ability to operate without any moving parts in the reactor such as paddle blades or stirring mechanisms requiring complex sealing mechanisms, all of which would be subject to excessive corrosion and erosion, especially at elevated temperatures and pressures, (6) the ability to construct the reactor of acid resistant brick, rather than expensive metals or alloys, because there are no moving parts, and (7) the ability to calculate optimum fluidization for carrying out an optimum reaction process.

(8) the ability to achieve a staging effect of a counter-current stirred tank leaching reactor.

It should be noted that items (5) and (6) are important because at elevated temperatures, and especially above about 150° C., only expensive metals and alloys resist attack by acid. Thus, the process of this invention permits the construction of a reactor system which both can operate at high temperatures and can utilize inexpensive materials of construction. Similarly, item (3) is important because it permits the use of inexpensive materials of construction downstream of the reactor to receive the reacted ore.

SUMMARY OF THE INVENTION

In a continuous process for reacting particulate ore with a liquid reagent in a counter-current vertical column, wherein liquid reagent is introduced at the bottom of the column, particulate ore is introduced at the the top of the column, reacted particulate ore is removed at the bottom of the column, and spent liquid reagent is removed at the top of the column, the improvement comprising:

(a) providing an upper and lower chamber for the vertical column, each of said chambers having a bottom outlet with a diameter which is less than that of the diameter of the chamber;

(b) maintaining sufficient upward flow of liquid reagent in the upper chamber so that the particulate ore is wetted and deaerated, at least some fine particles thereof are carried overhead for removal, and the remainder thereof settle and enter the lower chamber, (c) maintaining sufficient fluidization and retention time in the lower chamber so that the desired amount of reaction with the ore takes place, at least some of the fine ore particles which are generated from the reaction process and/or which are introduced with the particulate ore are entrained and carried upward for removal, and the reacted particulate ore exits the lower chamber.

In accordance with a preferred embodiment of this invention there is provided:

In a continuous process for leaching particulate ore with acid in a counter-current vertical column, wherein acid is introduced at the bottom of the column, particulate ore is introduced at the the top of the column, leached particulate ore is removed at the bottom of the column, and spent acid is removed at the top of the column, the improvement comprising:

(a) providing an upper and lower chamber for the vertical column, each of said chambers having a bottom outlet with a diameter which is less than that of the diameter of the chamber;

(b) maintaining sufficient upward flow of acid in the upper chamber so that the particulate ore is wetted and deaerated, at least some fine particles thereof are carried overhead for removal, and the remainder thereof settle and enter the lower chamber;

(c) maintaining sufficient fluidization and retention time in the lower chamber so that the desired amount of impurities are leached from the particulate ore, at least some of the fine ore particles which are generated from the leaching process and/or which are introduced with the particulate ore are entrained and carried upward for removal, and the leached particulate ore exits the lower chamber.

DETAILED DESCRIPTION OF THE INVENTION

General Process Description

The process of this invention is suitable for any process which reacts particulate ore with a liquid reagent. By "react" is meant to dissolve, leach, oxidize, reduce, complex, crystalize, intercalate or otherwise react or any combination thereof.

The process of this invention utilizes a vertical column having an upper chamber and a lower chamber. The primary purpose of the upper chamber is to wet the particulate ore being fed with the liquid reagent, deaerate it, and carry some of the ore fines upward for removal. While not its main function, some ore reacting may take place in the upper chamber. The purpose of the lower chamber is to carry out the reacting process and and also to permit ore fines which are generated to be carried off overhead to the upper chamber. In a preferred embodiment of this invention, the diameter of the upper chamber will be at least twice that of the lower chamber.

Generally, the fluidization index for the upper chamber and the lower chamber will be within a range sufficient to carry out the functions mentioned in the preceding paragraph. The fluidization index is defined as follows:

$$X = L/Gmf + [(S/Gmf) \times (P_1) \times (E/P_s)(1-E)]$$

wherein $X$ = the fluidization index $L$ = the liquid upflow rate

S=the solid downflow rate

Gmf=the minimum fluidization velocity for a bed of solids from which no solids are withdrawn $P_1$=the liquid density $P_S$=the solid density E=the void fraction at the design condition.

Preferably, the fluidization index in the upper chamber will be about 5–6, more preferably about 5.1–5.9, and most preferably about 5.4–5.6. An especially preferred fluidization index for the upper chamber is about 5.5. Preferably, the fluidization index in the lower chamber will be about 1–2, more preferably about 1.1–1.9, and most preferably about 1.4-1.6. An especially preferred fluidization index for the lower chamber is about 1.5. Under preferred conditions, there generally will not be global mixing of the particulate ore.

Usually, each chamber will have a bottom outlet which has a diameter less than that of the diameter of the chamber. Preferably, the outlet of each chamber will be funnel shaped. Preferably, the angle of the funnel will be greater than the angle of repose of the particulate ore which will be processed.

An important aspect of the process of this invention is that it can be operated under pressure. If the process is operated under pressure, and dry, particulate ore is used, a suitable feed device will be needed to introduce the ore into the upper chamber. Such a suitable device is a dual lock hopper. In such device, ore enters an upper chamber which is periodically sealed off at the feed point. Then, the ore is allowed to flow out of an exit opening into a second chamber, which is then sealed off so that the ore therein can be fed to the pressurized column. An alternative means for feeding ore into the pressured column is to incorporate the ore in a liquid to make a slurry or to incorporate the ore in the liquid reagent to make a slurry either of which is then fed to the reactor.

In another important aspect of this invention, liquid is injected in the outlet or a conduit leading from the outlet of the lower chamber, and such injection is made at a sufficient volume and velocity (a) to cool said reacted particulate ore and liquid reagent exiting the lower chamber, and (b) to restrict the downward flow of said liquid reagent. Because of the cooling that this aspect of the invention effectuates, the receiving vessel for the reacted ore can be constructed of less expensive materials than would be required if the cooling did not take place. Also, restricting the flow of liquid reagent in this manner results in less waste of liquid reagent because less of it exits the process with the ore.

Still another aspect of this invention is its ability to operate without any moving parts in the reactor such as paddle blades or stirring mechanisms requiring complex sealing mechanisms, all of which would be subject to excessive corrosion and erosion, especially at elevated temperatures and pressures. And, because this invention does not require any moving parts, the reactor itself can be constructed of inexpensive acid resistant brick.

Liquid Reagents for Process of this Invention

Suitable reagents for use in the process of this invention include those which dissolve, leach, oxidize, reduce, complex, crystalize or intercalate or otherwise carryout the desired reaction with the ore. Examples of suitable reagents include acids, bases, complexing agents, oxidizing agent, and reducing agents, either alone or in a solution or dispersion in aqueous media.

Suitable acids for use in the process of this invention include mineral acids such as hydrochloric acid, nitric acid, sulfuric acid, phosphoric acid, hydrofluoric acid, and mixtures thereof. Especially preferred are hydrochloric acid, nitric acid, hydrofluoric acid, and mixtures thereof. Most especially preferred is hydrochloric acid, especially for leaching of titanium ores or titanium-containing materials.

Aqueous solutions of cyanide can also be used as a leaching agent to dissolve gold or silver from certain ores so that they can then be recovered.

Examples of suitable bases include alkali metal compounds including sodium hydroxide, sodium carbonate, potassium hydroxide, potassium carbonate, lithium hydroxide, and lithium carbonate. Preferred are sodium hydroxide and sodium carbonate. Most preferred is sodium hydroxide.

The liquid reagent should be utilized in an effective amount, i.e., an amount and concentration sufficient to carry out the desired amount of reaction with the particulate ore. Often at least 10 percent, preferably at least 30 percent and most preferably at least 50 percent of the theoretical amount of reaction with the ore will take place. For example, if the liquid reagent is an acid or a base, it will be used in an amount sufficient to solubilize substantially the impurities desired to be removed. Analysis of the leachate, i.e., the acid or base solution containing the dissolved impurities, and the leached ore can readily determine whether or not the amount and/or concentration of acid is sufficient.

Typically, the liquid reagent will be in the form of an aqueous solution or suspension of the active ingredient. Often, the concentration of the active ingredient in the liquid reagent will be about 0.5–50%, preferably about 3–30%, and most preferably about 15–25% by weight, based on the total weight of the solution or dispersion. If sulfuric acid is used for the beatification of titanium-containing ore, then lower concentrations within the foregoing ranges may be preferable because higher concentrations of sulfuric acid may dissolve undesirable amounts of $TiO_2$.

Temperature, Pressure, Residence Time and Other Parameters

The reaction should take place at a temperature and pressure, and for a time which is sufficient to carry out the desired amount of reaction with the particulate ore.

Ordinarily, the residence time of the ore in the process of this invention will be at least about 5minutes. Typical ranges of time are about 10 minutes to four hours, preferably about 10 minutes to two hours and most preferably about 10 minutes to one hour.

The temperature will ordinarily be about ambient to 300° C. For many ores, improved results will often be obtained (e.g. less residence time of ore in the process and improved reaction or removal of impurities) at temperatures in excess of ambient up to about 300° C., preferably about 100°–300° C., more preferably about 150°–300° C., and most preferably about 160°–250° C. For titanium dioxide containing ores, a preferred range is about 150–250 and more preferably about 190°–210° C.

Suitable results can often be obtained by operation at atmospheric pressure. However, improved results can often be obtained by operation at pressures in excess of atmospheric such as about 2–100, preferably about 5–75, and most preferably about 10–60 atmospheres absolute. Often the pressure will generally be autogenous, i.e. that generated in the closed process vessel under the reacting conditions. However, additional pressurization can be added, if desired, which may speed removal of impurities from some ores. Note that a pressurized system can also be desirable to condense vaporized acid and thus minimize its loss.

Generally, at least some of the fine ore particulates which are generated from the reaction process and/or which are introduced with the particulate ore are entrained and carried upward for removal. Often, at least about 10 percent, preferably at least about 30 percent, and most preferably at least about 50 percent by weight of such fine ore particulates will be entrained and carried upward for removal. The particle size of the fine particulates which are carried upward for removal can vary depending on the density of the liquid reagent and the ore, the desired degree of reaction, and the desired particulate size of the ore exiting the reactor. Often, the size of the particles which are carried upward for removal can be adjusted by manipulating the flow rates, temperature, and/or diameter of the reactor.

Generally, the solids concentration in the upper and lower chamber of the column will be about 10–70 percent, preferably about 15–60 percent and most preferably about 20–60. Optimum results are often obtained at about 40–60 percent and especially about 45–55 percent. As used in this paragraph, the percentages are by weight, based on the total weight of the liquid reagent and ore.

In a preferred embodiment of this invention, an acid or base or any other suitable chemical reactant will be used to solubilize substantially the impurities in the ore. By the term "solubilize substantially," as used herein to describe the process of this invention where acid or base is used, is meant the concentration of acid or base and conditions of temperature, pressure, and time which will solubilize at least about 10% by weight of the total impurities. Preferably, at least 50% of the total impurities will be solubilized. Often, a graph of the concentration of the acid or base and conditions of temperature and time, compared to the amount of impurities removed will help to determine trends and optimizations.

BRIEF DESCRIPTION OF THE DRAWING

The process of this invention and its operation are illustrated by reference to the drawing. The drawing depicts a process operating under pressure, but it is understood that the process of this invention can be operated under atmospheric pressure. The process depicts a process wherein the liquid reagent is an aqueous solution of acid. It is understood, however, that any other liquid reagents could be used which is suitable to carry out the desired reaction on the particulate ore being treated.

In the drawing, particulate ore enters the process at point 1, and passes into lock hopper 4 and then into lock hopper 5. Valves 2 and 3 regulate the flow of ore, which are controlled by radiation emitter 13 and sensor 14, which detect the level of ore needed in the process. Valves 2 and 3 have control logic so that both are not open at the same time, which permits ore to enter the pressurized process. Note that if the process were operating under atmospheric pressure, this dual lock hopper system would not be needed. An alternative method for feeding the ore would be to introduce the ore into the process in the form of a slurry.

Figure 1:
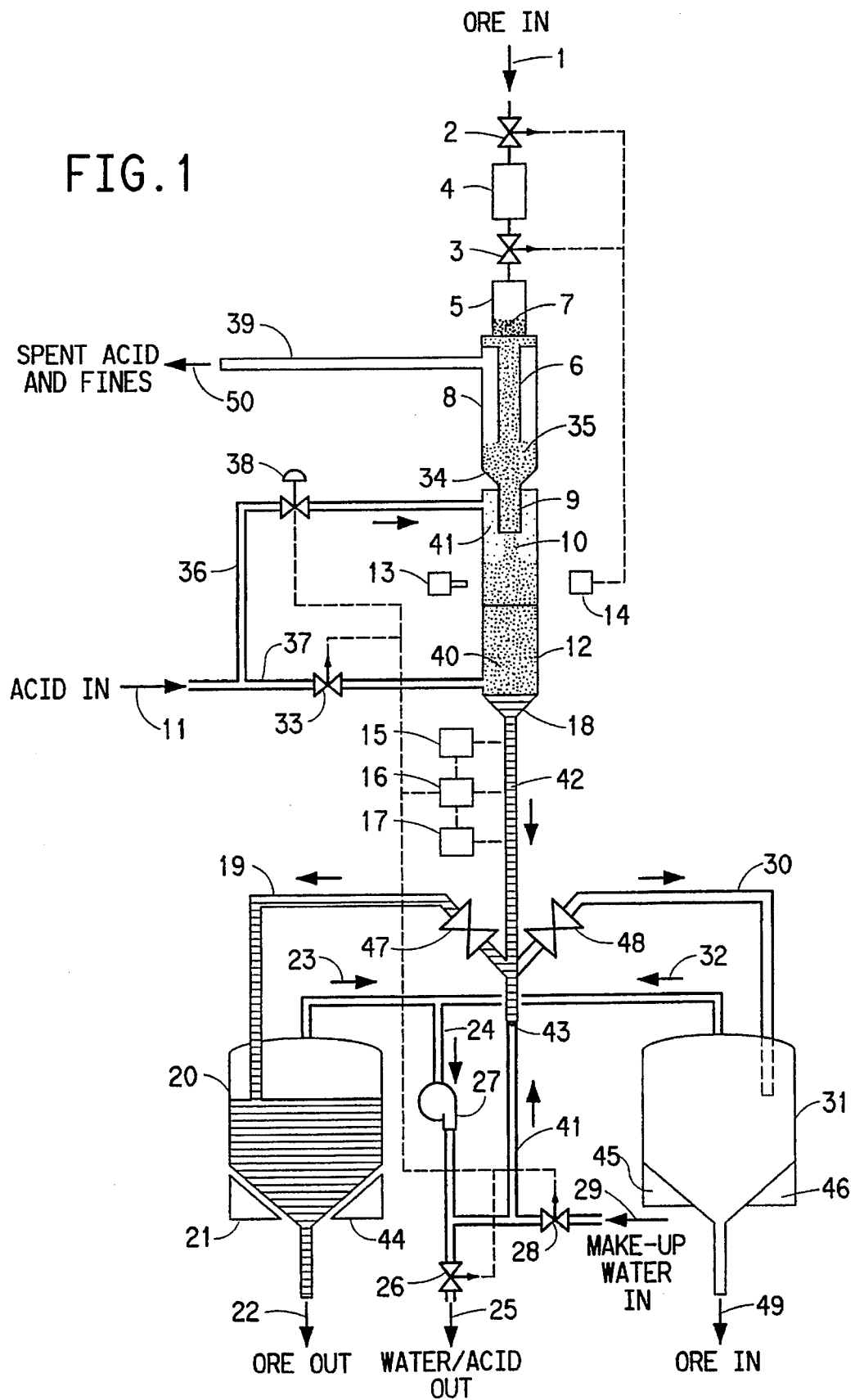

Ore 7 then enters the upper chamber 8 through feed tube 6. Funnel conduit 9 forms the lower part of the upper chamber 8 and permits a reservoir of ore 35 to be maintained in the upper chamber 8.

Ore exits the upper chamber 8 at point 10 and enters lower chamber 12. Acid is fed to the process at point 11, and then enters lower chamber 12 through pipes 36 and 37. While pipe 36 is optional, it represents a preferred embodiment which may enhance the entrainment of fine particles of ore in the upward flowing acid so that they can be removed through pipe 39.

The flow rate of acid is controlled by valve 33 and, if necessary, valve 38. Often, a relatively constant flow of acid will be desirable.

Flow through valve 33 will depend on the solids flow rate and the particle size. Sensors 15, 16, and 17, and their associated control logic, actuate valves 26 and 28 and the flow of make-up water 29 in and water/acid out of the process. Spent acid and ore fines exit the process at point 9 through pipe 39.

A reservoir of ore 40 is maintained, preferably under fluidized conditions, in lower chamber 12 so that the desired reacting takes place. Fine particulate ore 41 generated in the reacting process taking place in the lower chamber 12 rises and enters the upper chamber 8 through funnel conduit 9.

Leached ore/acid slurry 42 exits lower chamber 12 through funnel conduit 18. Water 29 enters the funnel conduit 18 through pipe 41 and interfaces the leached ore acid slurry 42 at point 43. The water 29 cools the leached ore/acid slurry 42 so that the receiving vessels 20 and 31 can be constructed of less expensive materials. The water 29 also retards the flow of the leached ore/acid slurry 42 so that it can be directed through pipes 19 and 30 to receiving vessels 20 and 31.

Weight sensors 21, 44, 45, and 46 detect the amount of ore in receiving vessels 20 and 31. Valves 47 and 48 are connected to weight sensors 21, 44, 45, and 46 (not shown in Drawing so that other features can be shown) by control logic so that the leached ore can be shunted to either of receiving vessels 20 or 31. In lieu of the two receiving vessels, there can be used a single receiving vessel, filtering means or other separation means such as a centrifuge. Acid separated from the leached ore is removed from receiving tanks 20 and 31 through pipes 20 and 31. The leached ore exits the process at points 22 and 49.

Ore

It is believed that any suitable ore can be used in the process of this invention. Suitable ores include those in which the metal desired to be recovered, upgraded in purity or concentrated include titanium, niobium, nickel, cobalt, copper, zinc, lead, cadmium, aluminum, silver, and gold. Preferred are titanium-containing ores including those ores in the form of ilmenite and anatase (including anatase from a carbonatite source such as Brazilian anatase). As used herein, the term "ore" includes the raw ore itself, ore which has been beneficiated or upgraded by other processes or ore which is the by-product of other processes. Examples of such by-products include Sorel's slag, which is a by-product obtained during iron production from a titanium-containing iron ore in Sorel, Canada, and fine ore blown over from a fluidized bed reactor for chlorinating $TiO_2$ ore. Such a reactor is often used as the first step in the chloride process for making titanium dioxide pigment.

Ore Impurities

The impurities which are suitable for removal in accordance with the process of this invention, and especially when an aqueous solution of acid is used for a leaching process, include alkali metals, alkaline earth metals, rare earth metals, iron, aluminum, phosphorus, thorium, uranium, chromium, manganese, vanadium and yttrium. Especially suitable for removal by the process of this invention are the impurities of iron, phosphorus, aluminum, calcium, barium, strontium, chromium, manganese, vanadium, yttrium, lanthanum, cerium, neodymium, thorium, and uranium. The impurities of phosphorus, aluminum, iron, calcium, barium, strontium, and radionuclides such as thorium and uranium are especially detrimental to the chloride process for making $TiO_2$ pigment; such impurities are especially suitable for reduction to acceptable levels by the process of this invention under conditions of elevated temperatures and pressures. Also, while the impurities of aluminum, rare earths, phosphorus, thorium, and uranium are especially resistant to removal by conventional chemical or mechanical means, they are especially suitable for reducing to acceptable levels by the process of this invention under conditions of elevated temperatures and pressures.

Particle Size of Ore

For the process of this invention, preferably, the ore should be in particulate form. The optimum particle size for any ore desired to be processed can readily be determined by comminuting (such as by grinding, crushing, milling, etc.) the ore into several different particle sizes and evaluating the amount of impurities removed by the process of this invention.

Generally, it can be desirable to liberate the minerals to be separated from the ore, i.e., to comminute the ore into as fine particles as practical so that discrete minerals or nearly discrete minerals in the particles are improved.

Ordinarily, the ore should have a particle size of less than about one-fourth inch. Preferably, the ore will have a particle size of about −20 mesh to +400 mesh. Of course, some ores in their natural state have a particle size within this range. If so, additional comminuting is not necessary.

Mineral Dressing of Ore

If desired, the ore can be subjected to mineral dressing prior to subjecting to the process of this invention. By mineral dressing is meant mechanical processes which can remove some of the undesired impurities, including desliming (removing fine particles by a cyclone, grating or settling process), crushing, grinding, classification, screening, flotation, electrostatic separation and magnetic separation. The magnetic separation can include low, medium and high intensity magnetic field strength and/or gradient; including, preferably, staged magnetic separation sequential through low, medium and high intensity magnetic field strengths. Suitable mineral dressing processes are disclosed in U.S. Pat. No. 4,243,179, which is hereby incorporated by reference. If mineral dressing is used, it can be designed to reduce the ore to the desired particle size in order to satisfy both mineral liberation and preferred particle size for use in the process of this invention.

Low Temperature Reductive Roasting and Magnetic Separation

Optionally if the ore is of ferrogenous origin, prior to the reaction process of this invention, the ore can be subjected to low temperature reductive roasting. The purpose of such low temperature reductive roasting is to convert some of the iron-bearing minerals in the ore to magnetic form, if present, which then can be removed by magnetic separation techniques.

If low temperature reductive roasting is used, it generally will be carried out at a temperature in excess of ambient conditions up to about 400° C., in the presence of a carbonaceous reducing agent. Preferably the temperature will be about 200–400 and most preferably about 250–300° C. Suitable carbonaceous reducing agents include coke, lignite char, charcoal, coal, lignite, petroleum such as residual oil, carbon monoxide, producer gas, hydrogen, gaseous hydrocarbons, and natural gas.

Preferred is carbon monoxide. Note that to use reducing agents other than carbon monoxide, the roasting temperature should exceed about 300° C. The roasting should take place under reductive conditions, i.e., in the substantial absence of air or oxygen or under conditions which favor reduction rather than oxidation.

If low temperature roasting is used, it can be carried out by any suitable means, process or device. For example, a fixed bed, rotary kiln, fluidized bed, a plasma jet, batch or continuous process can be utilized.

The time required for the low temperature roasting step can readily be determined by making several experimental trials and selecting those which produce the desired results with the lowest temperature and the least time so that output can be optimized and energy consumption can be minimized. Suitable times often will be in the range of about five minutes to 8 hours, preferably about five minutes to 2 hours, and most preferably about 15 minutes to one hour.

If the low temperature roasting step is used, it preferably should be followed-up with wet or dry magnetic separation to remove the iron containing materials which have been converted to magnetic form.

It has been found that low temperature reductive roasting may make phosphorus, aluminum, thorium and uranium, in certain types of ore, more resistant to the reaction process of this invention, especially if acid is used to carry out a leaching process. Therefore, if these impurities are present in appreciable amounts, low temperature reductive roasting may not be suitable. Running a few experimental tests can readily determine whether or not a low temperature reductive roast will be beneficial.

High Temperature Reductive Roasting of Ore

If the process of this invention carries out a leaching of ore with mineral acid, then, optionally, prior to leaching, the ore can be subjected to a high temperature reductive roasting. It has been found in certain types of ore that such roasting can further reduce the amounts of phosphorus compounds in the ore and lower the temperature needed for the reaction process. If a high temperature reductive roasting is used, it generally will be carried out at a temperature of about 900°–1700° C., in the presence of a carbonaceous reducing agent. Suitable carbonaceous reducing agents include coke, lignite char, charcoal, coal, lignite, petroleum such as residual oil, carbon monoxide, producer gas, hydrogen, and natural gas. The roasting should take place under reductive conditions, i.e., in the substantial absence of air or oxygen or under conditions which favor reduction rather than oxidation. A preferred temperature range is about 1100°–1500° C. It has also been found that a high temperature reductive roasting can enhance the removal of thorium and uranium, but may be detrimental to the removal of aluminum.

If high temperature roasting is used, it can be carried out by any suitable means, process or device. For example, a fixed bed, rotary kiln, fluidized bed, a plasma jet, batch or continuous process can be utilized.

The time required for the high temperature roasting step can readily be determined by making several experimental trials and selecting those which produce the desired results with the lowest temperature and the least time so that output can be optimized and energy consumption can be minimized. Suitable times often will be in the range of about five minutes to 8 hours, preferably about five minutes to 2 hours, and most preferably about 15 minutes to one hour.

For treatment of titanium-containing ores with mineral acid in accordance with the process of this invention, it is emphasized that generally a low or high temperature reductive roast should not be needed. Thus, for a titanium-containing ores, a substantial advantage of this invention is its potential to operate at lower investment and operating costs because reductive roasting is not needed.

Preleach of Ore

If desired, prior to the process of this invention, the ore can be subjected to a preleach operation. The purpose of the preleach step is to remove impurities which can be removed with milder conditions than the reacting step described below. Use of the preleach step could enhance the economics of the process and, in some grades of ore, could improve quality, especially for titanium-containing ores.

The acids and concentration of acids described herein for the reacting step can be used. Also, if desired, the spent acid from the leach step can be used as the feed for the preleach step. Suitable temperatures are about 50°–100° C., preferably about 60°–90° C. and most preferably 70°–80° C. The pressure ordinarily will be about atmospheric.

Wash with Alkali Metal Compound

Optionally, for some ores, after the ore is subjected to the process of this invention, it can be subjected to washing with an aqueous solution of an alkali metal compound after the liquid reagent has been removed from the ore. Such washing may be helpful to reduce further the amount of phosphorus, aluminum, and silicon impurities. Washing with an alkali metal compound may be beneficial for $TiO_2$ ores and especially anatase ores.

Suitable alkali metal compounds which can be used include sodium hydroxide, sodium carbonate, potassium hydroxide, potassium carbonate, lithium hydroxide, and lithium carbonate. Preferred are sodium hydroxide and sodium carbonate. Most preferred is sodium hydroxide.

The alkali metal compound should be used in an effective amount, i.e., an amount and concentration sufficient to solubilize substantially at least some of the impurities. Analysis of the leachate, i.e., the solution of the alkali metal compound containing the dissolved impurities, and the leached ore can readily determine whether or not the amount and concentration of alkali metal compound are sufficient. Ordinarily, the concentration of alkali metal compound will be about 3–30 percent, preferably about 5–15 percent, and most preferably about 10–15 percent by weight, based on the total weight of the solution.

The washing treatment with the aqueous solution of an alkali metal compound will take place at a temperature, pressure, and time which is sufficient to solubilize at least some of the remaining mineral impurities. Ordinarily, the time required will be at least about one-half minute. Typical ranges of time are about one-half minute to three hours, preferably about one minute to two hours, and most preferably about one minute to one hour. The temperature ordinarily will be about ambient to about the boiling point of the washing solution. It should be noted that elevated temperature often will decrease the amount of wash time required. Generally, atmospheric pressure will be adequate, although elevated pressures can be used if desired. If only atmospheric pressure is used for this step of the process, after the liquid reagent has been removed from the ore, the washing can be done by spraying alkali solution onto the ore which is on a filter or screen.

Removing the Leachate

Following the process of this invention, and the alkali metal wash, if used, the liquid reagent is removed from the treated ore. Preferably, this is done by removing the liquid reagent followed by washing with water or by washing with water alone. The liquid reagent can be removed by any suitable means, including filtering, decanting, centrifuging or use of a hydroclone. Preferably, the water will be hot, i.e., up to its boiling point. The amount of washing required can readily be determined by analyzing the wash water for the presence of impurities, acid and/or alkali.

Use of Treated Ore

After the ore has been treated in accordance with the process of this invention, it can be subjected to additional processes to recover or utilize the desired metallic values. For example, if titanium-containing ore is treated in accordance with the process of this invention, it then can be used to make $TiO_2$ pigment or titanium metal or be used in any process where a beneficiated titanium ore is desired. Preferably, titanium-containing ore treated by the process of this invention can be used to make $TiO_2$ pigment, and most preferably, to make $TiO_2$ pigment by the chloride process. Suitable chloride processes and reactors for using the titanium ore treated in accordance with the process of this invention are disclosed in U.S. Pat. Nos. 2,488,439, 2,488,440, 2,559,638, 3,203,763, 2,833,626, 3,284,159, and 2,653,078, which are hereby incorporated by reference.

The invention claimed is:

1. In a continuous process for reacting particulate ore with a liquid reagent in a counter-current vertical column, wherein liquid reagent is introduced at the bottom of the column, particulate ore is introduced at the top of the column, reacted particulate ore is removed at the bottom of the column, and spent liquid reagent is removed at the top of the column, the improvement comprising:

(a) providing an upper and lower chamber for the vertical column, each of said chambers having a bottom outlet with a diameter which is less than that of the diameter of the chamber;

(b) flowing a sufficient amount of liquid reagent upward in the upper chamber at a fluidization index of about 5–6 so that the particulate ore is wetted and deaerated, at least some fine particles thereof are carried overhead for removal, and the remainder of the particulate ore settles and enters the lower chamber;

(c) fluidizing the particulate ore with liquid reagent in the lower chamber and retaining the particulate ore in the lower chamber until at least 10 percent of the theoretical amount of reaction of liquid reagent with the particulate ore takes place to form reacted particulate ore and wherein at least some of the fine ore particles which are generated in this step or which are introduced with the particulate ore are entrained and carried upward for removal, and a slurry of the reacted particulate ore and liquid reagent exits the lowr chamber.

2. The process of claim 1 where the fluidization index in the lower chamber is about 1.1–1.9.

3. The process of claim 1 wherein the fluidization index in the lower chamber is about 1.4–1.6.

4. The process of claim 1 wherein the fluidization index in the lower chamber is about 1.5.

5. The process of claim 1 wherein the fluidization index in the upper chamber is about 5.1–5.9.

6. The process of claim 1 where the fluidization index in the upper chamber is about 5.4–5.6.

7. The process of claim 1 wherein the fluidization index in the upper chamber is about 5.1–5.9, and the fluidization index in the lower chamber is about 1.1–1.9.

8. The process of claim 1 wherein the fluidization index in the upper chamber is about 5.4–5.6, and the fluidization index in the lower chamber is about 1.4–1.6.

9. The process of any one of claims 1–8 wherein liquid is injected into the mixture of reacted particulate ore and liquid reagent exiting the lower chamber at a sufficient volume and velocity (a) to cool said reacted particulate ore and liquid reagent, and (b) to restrict the downward flow of said reacted particulate ore and liquid reagent.

10. The process of any one of claims 1–8 wherein the outlet for each chamber is funnel shaped, and the diameter of the upper chamber is at least twice that of the lower chamber.

11. The process of any one of claims 1–8 wherein the reaction temperature is up to about 300° C., and the pressure is up to about 100 atmospheres absolute.

12. The process of any one of claims 1–8 wherein the reaction temperature is about 160°–300° C., the pressure is about 4–100 atmospheres absolute, the ore is titanium-containing, and the liquid reagent is mineral acid.

13. The process of claim 1 wherein:
   (a) the temperature is up to about 300 degrees C., and the pressure is up to about 100 atmospheres absolute;
   (b) the ore is titanium-containing; and
   (c) the liquid reagent is hydrochloric acid.

14. The process of claim 13 wherein the temperature is about 150°–250° C.

15. The process of claim 14 wherein water is injected into the slurry of reacted particulate ore and acid exiting the lower chamber at a sufficient volume and velocity (a) to cool said reacted particulate ore and acid, and (b) to restrict the downward flow of said acid and ore.

16. The process of claim 15 wherein the outlet for each chamber is funnel shaped, the diameter of the upper chamber is at least about twice that of the lower chamber, the angle of the taper of the funnel is greater then the angle of repose of the particulate ore, and the neck of the funnel shaped outlet for the upper chaber extends into the upper portion of the lower chamber.

17. Process of claim 16 wherein (a) prior to reacting in the counter-current vertical column, the ore is subjected to mineral dressing, and (b) after the ore is subjected to reacting in the counter-current vertical column, it is subjected to washing with water to remove any residual acid.

* * * * *